United States Patent
Burke et al.

(10) Patent No.: US 8,343,581 B2
(45) Date of Patent: Jan. 1, 2013

(54) SYNTHESIS OF PURE NANOTUBES FROM NANOTUBES

(75) Inventors: Peter J. Burke, Irvine, CA (US); Zhen Yu, Irvine, CA (US)

(73) Assignee: Regents of the University of California, Oakland, CA (US)

( * ) Notice: Subject to any disclaimer, the term of this patent is extended or adjusted under 35 U.S.C. 154(b) by 912 days.

(21) Appl. No.: 11/742,032

(22) Filed: Apr. 30, 2007

(65) Prior Publication Data
US 2010/0132883 A1 Jun. 3, 2010

Related U.S. Application Data

(60) Provisional application No. 60/745,984, filed on Apr. 28, 2006.

(51) Int. Cl.
*C23C 16/00* (2006.01)
(52) U.S. Cl. .............. 427/249.1; 977/842; 977/843; 977/848
(58) Field of Classification Search ............. 427/249, 427/249.1
See application file for complete search history.

(56) References Cited

U.S. PATENT DOCUMENTS

| | | | |
|---|---|---|---|
| 5,591,312 A * | 1/1997 | Smalley | 204/157.41 |
| 6,514,113 B1 * | 2/2003 | Lee et al. | 445/50 |
| 6,756,026 B2 * | 6/2004 | Colbert et al. | 423/447.3 |
| 6,843,850 B2 * | 1/2005 | Avouris et al. | 117/40 |
| 2002/0092984 A1 | 7/2002 | Colbert et al. | |
| 2002/0136683 A1 * | 9/2002 | Smalley et al. | 423/461 |
| 2002/0150529 A1 * | 10/2002 | Dillon et al. | 423/460 |
| 2003/0180472 A1 * | 9/2003 | Zhou et al. | 427/430.1 |
| 2004/0150312 A1 * | 8/2004 | McElrath et al. | 313/310 |
| 2004/0228961 A1 * | 11/2004 | Smits et al. | 427/2.13 |
| 2005/0062062 A1 | 3/2005 | Bertin et al. | |
| 2005/0112051 A1 * | 5/2005 | Liu et al. | 423/447.1 |
| 2010/0119435 A1 * | 5/2010 | Roach et al. | 423/447.2 |

OTHER PUBLICATIONS

Hertel "Deformation of carbon nanotubes by surface van der Waals forces" Nov. 15, 1998 Phy. Rev.B Vo 58 No. 20.*
Zhong et al "Patterned Growth of Coiled Carbon Nanotubes by a Template-Assisted Technique." Appl. Phys. Let. Nov. 2003, 83(21): 24; p. 4423, col. 2, para 1 and 2; Fig and 4.

* cited by examiner

*Primary Examiner* — Timothy Meeks
*Assistant Examiner* — Mandy Louie
(74) *Attorney, Agent, or Firm* — Dickstein Shapiro LLP; Kenneth S. Roberts

(57) ABSTRACT

An improved method of synthesizing nanotubes that avoids the slow process and the impurities or defects that are usually encountered with regard to as-grown carbon nanotubes. In a preferred embodiment, nanotubes are synthesized from nanotubes providing a novel catalyst-free growth method for direct growth of single- or multi-walled, metallic or semiconducting nanotubes.

13 Claims, 3 Drawing Sheets

SYNTHESIS OF PURE NANOTUBES FROM NANOTUBES

CROSS-REFERENCE TO RELATED APPLICATION

This application claims benefit of U.S. provisional patent application Ser. No. 60/745,984, filed Apr. 28, 2006, which application is incorporated herein by reference.

FIELD OF THE INVENTION

The present invention relates to nanotubes and, more particularly, to the use of nanotubes to synthesis pure nanotubes.

BACKGROUND

Nanotubes are commonly made from carbon and comprise graphite sheets seamlessly wrapped into cylinders. Nanotubes can be single-walled or multi-walled. Single-walled nanotubes (SWNTs) comprise single cylinders and represent nearly ideal one dimensional electronic structures. Multi-walled nanotubes (MWNTs) comprise multiple cylinders arranged concentrically. Typical dimensions are 1-3 nm for SWNTs and 20-100 nm for MWNTs.

Nanotubes can be either metallic or semiconducting depending on their structure. Traditional nanotubes are contaminated by metallic catalyst, which serve as root of grown nanotubes.

Traditional nanotubes are contaminated by metallic catalyst, which serve as root of grown nanotubes. Additional processes are needed to purify the as grown CNTs. This is a slow process and requires special training. Currently, researchers are focused on the slow, post-growth purification process.

In addition, another challenge facing nanotube synthesis today is that all methods result in a heterogeneous mixture of different nanotube diameters and chiralities. More specifically, all known synthesis methods results in a mixture of (n,m) indices, where (n,m) describes the crystal structure of the nanotubes. Both semiconducting and metallic nanotubes are present in the mixture. Of the semiconducting nanotubes, different diameters lead to different band gaps, affecting the electronic properties.

Thus, it is desirable to provide a method of nanotube systhesis that results in a homogeneous mixture of nanotubes having the same diameters and chiralities, and avoids the slowness and the impurities or defects that are usually encountered with the process for as-grown carbon nanotubes.

SUMMARY

An improved method of synthesizing nanotubes is provided. The improved method avoids the slowness and the impurities or defects that are usually encountered for instance with the process for as-grown carbon nanotubes. At the same time, it is an easy way to directly grow single- or multi-walled, metallic or semiconducting nanotubes depending on the original donor, host or seed nanotubes.

In a preferred embodiment, nanotubes are synthesized from seed nanotubes providing a novel catalyst-free growth method for nanotubes such as carbon nanotubes (CNTs) and the like. The proposed method advantageously enables industrial scaling up of the production of nanotubes such as SWCNTs and the like, and thus enables the large scale production of integrated nanotube circuits.

Further, objects and advantages of the invention will become apparent from the following detailed description.

BRIEF DESCRIPTION OF PREFERRED EMBODIMENTS

An improved method, preferably a catalyst-free method, of synthesizing nanotubes is provided. In a preferred embodiment, nanotubes, acting as "seed" nanotubes, are used to synthesis pure nanotubes, instead of using a traditional metallic catalyst to grow nanotubes. In this method no additional purifying process is needed and the diameter of nanotubes can be controlled, e.g., controlled as a function of the diameter of a seed nanotube.

Figure 1:
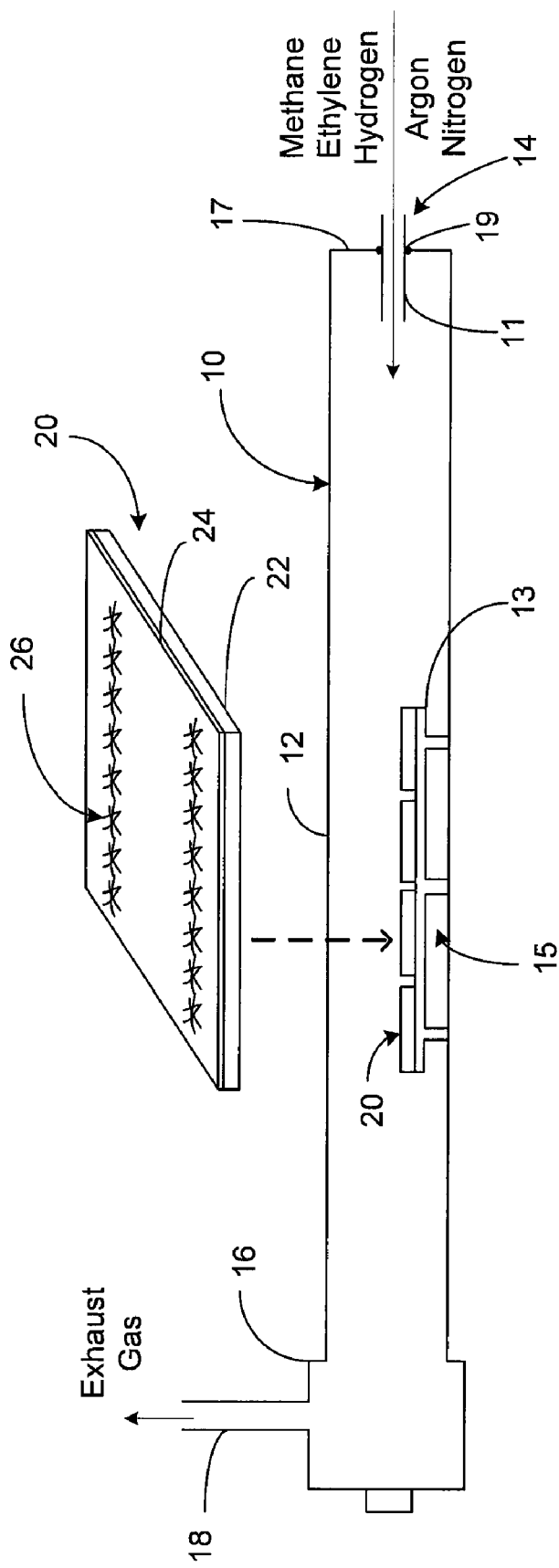
FIG. 1 is a schematic of a chemical vapor deposition system for use in the synthesis of nanotubes from host nanotubes.

The nanotubes are preferably grown in a CVD (chemical vapor deposition) system or furnace that minimizes turbulence in the process gas flow. An exemplary embodiment of a furnace 10 is illustrated in FIG. 1. As depicted, the furnace 10, preferably a Lindberg furnace, comprises a growth tube 12 preferably about three inches (3") in diameter, and preferably formed from quartz. A first closed end or inlet end 17 includes a gas-flow injector 14 used to minimize turbulent flow. The injector 14 preferably includes a smaller diameter tube 11 inserted into the larger diameter growth tube 12 at the inlet end 17 through an airtight fitting 19. Instead of injecting gas directly in through an open end of the larger diameter growth tube 12, the gas flows through the smaller diameter tube 11 and into the growth tube 12. As a result, less turbulent gas flow and more efficient pre-mixing of the gases before injection into the growth tube 12 is achieved. The reduced turbulence in gas flow provides a more stable and consistent environment for nanotube growth which promotes the synthesis of long carbon nanotubes.

The growth tube 12 further comprises an end cap 16 at a second end. The end cap 16 includes an exhaust tube 18. During the CVD process, samples 20 are placed on a platform 13 position within the growth tube in an active growth region or zone 15 of the tube 12.

In a preferred embodiment, a sample 20 comprises seed nanotubes 26 adhered to a wafer 22 coated with an adhesion promoting layer 24. The wafer 22 preferably comprises an oxidized, p-doped Si wafer and the adhesion layer preferably comprises SiO2 layer having a thickness in the range of about 300-400 nm. The seed nanotubes 26 need not be placed on top of the wafer in any particular order and could be completely randomly deposited on the wafer. Alternatively, the seed nanotube can be oriented in a predetermined orientation such as in a parallely spaced orientation. Although preferred, the seed nanotubes need not be physically adhered to the top of a solid support as shown in FIG. 1, but rather could be free floating.

Figure 3:
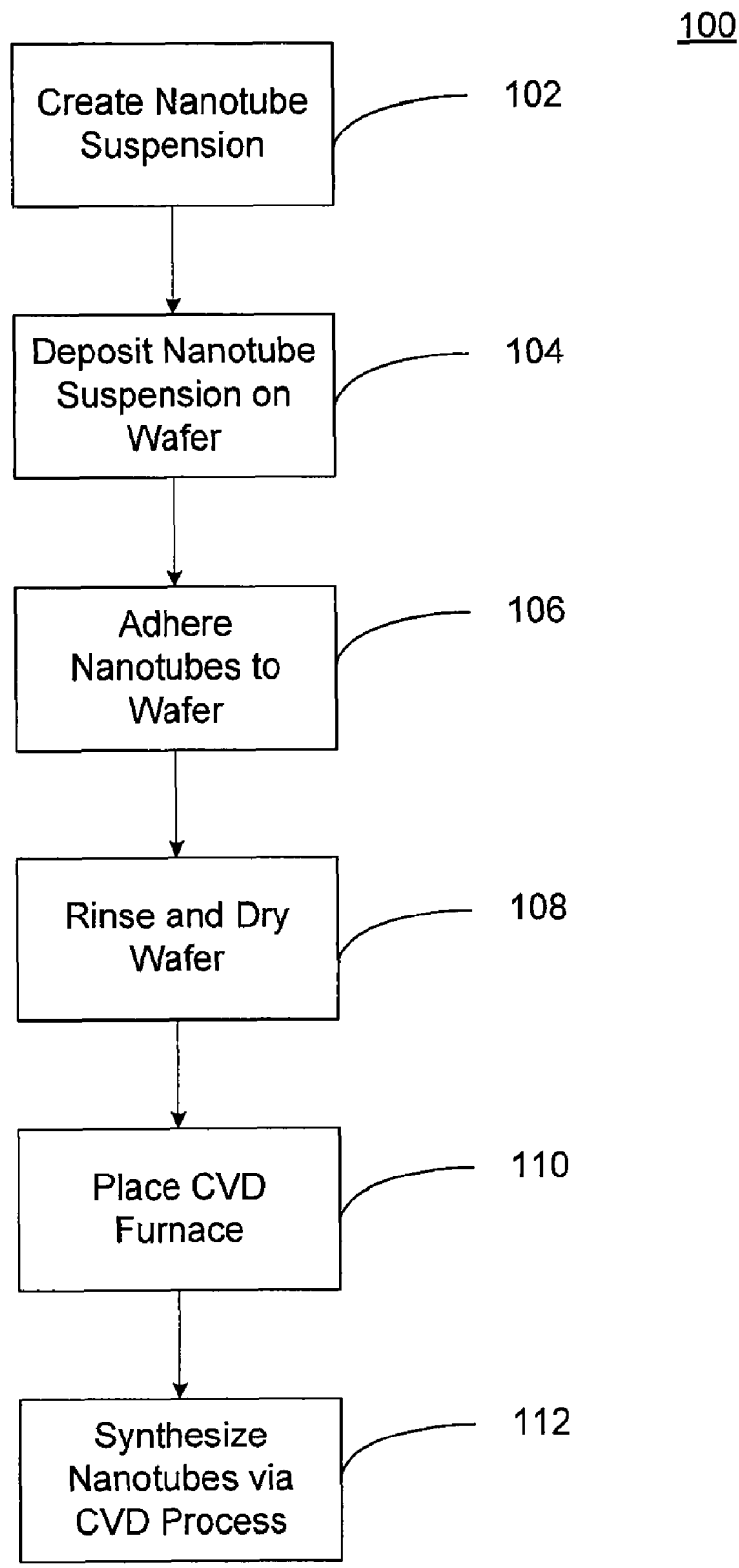
FIG. 3 is a flow chart illustrating the method of synthesizing nanotubes from host nanotubes.

As depicted in FIG. 3, the preferred method or process 100 a suspension of host or donor nanotubes is created at step 102 followed by the deposition of a volume of the nanotube suspension on a wafer or substrate at step 104. After a sufficient period of time for the host nanotubes to adhere to the wafer at step 106, the suspension solution is rinsed from the wafer and the wafer is dried at step 108. The sample (wafer with adhered nanotubes) is them placed in a CVD system at step 110 and pure nanotubes are then synthesized from the donor nanotubes in a CVD process at step 112.

A preferred growth procedure is as follows: First, the sample is heated to about 900 C in Ar over the course of 1.5 hours. Next, H2 is flowed for 10 minutes. Next, methane-hydrogen mixture (1000 sccm/H2 (200 sccm) is flowed for 15 minutes to activate tube growth. The sample is then allowed to slowly cool in Ar. Alternatively, growth gasses can be used to form nanotubes of other materials.

The proposed method advantageously could be used to grow a long nanotube of arbitrary length even longer, with the newly synthesized longer tube having the same (n,m) index as the original or donor tube. The longer synthesized tube could then be cut into pieces (e.g. by sonication), which could then be used as seed tubes from which to grow or synthesize longer tubes. By iterating this process, a macroscopic amount of nanotubes, all having the same (n,m) structure as the original seed nanotube can be generated.

The proposed method also advantageously produces pure or impurities free nanotubes, and can be used to do generate large quantities of pure nanotubes comprising heterogeneous or homogeneous mixtures of (n,m) indices. A very small quantity of nanotubes with non-nanotube material present can be used as a starting or seed material. After many growth runs of growing nanotubes from nanotubes, a large quantity of nanotubes can be generated with only a small quantity of the undesired starting material present in a non-nanotube form.

In an exemplary experiment, a plurality of single-walled carbon nanotubes (from Carbon Nanotechnologies, Inc.) in the form of "BuckyPearls" were used as host or donor nanotubes for the experiment. The host nanotubes had lengths in a range of about 0.1-1 μm and diameters in a range of about 0.8-1.2 nm. In general, the seed nanotubes can be of arbitrary length and diameter.

The host nanotubes were dispersed in de-ionized (DI) water and sonicated for about 20 minutes at about room temperature. Other solvents such as 1,2 Dichloroethane (DCE) have been used in other experiment with similar results. Other methods can be used to create a nanotube suspension, such as those methods described in Bockrath, PhD Dissertation, University of California, Berkeley (1999) and J. M. Bonard et al., Advanced Materials 9, 827 (August 1997).

Next, a drop of the nanotube suspension was deposited on the surface of oxidized, p-doped Si wafers with about a 300-400 nm thick SiO2 layer. The suspended nanotubes were adhered to SiO2 layer by Van der Waals forces.

After about 10 seconds, the suspension was rinsed away the suspension with 2-propanol (IPA) and the wafer was blown dried.

The samples, i.e., the wafers with adhered host nanotubes, were put into a furnace to synthesize carbon-nanotubes (CNTs) via chemical vapor deposition. The synthesis was carried out using a CVD system based shown in and described in regard to FIG. 1. The growth procedure was as follows: First, the sample was heated to 900 C in Ar over the course of 1.5 hours. Next, H2 was flowed for 10 minutes. Next, a methane-hydrogen (1000 sccm/200 sccm H2) mixture was flowed for 15 minutes to activate the nanotube growth. The sample was then allowed to slowly cool in Ar.

Figure 2:
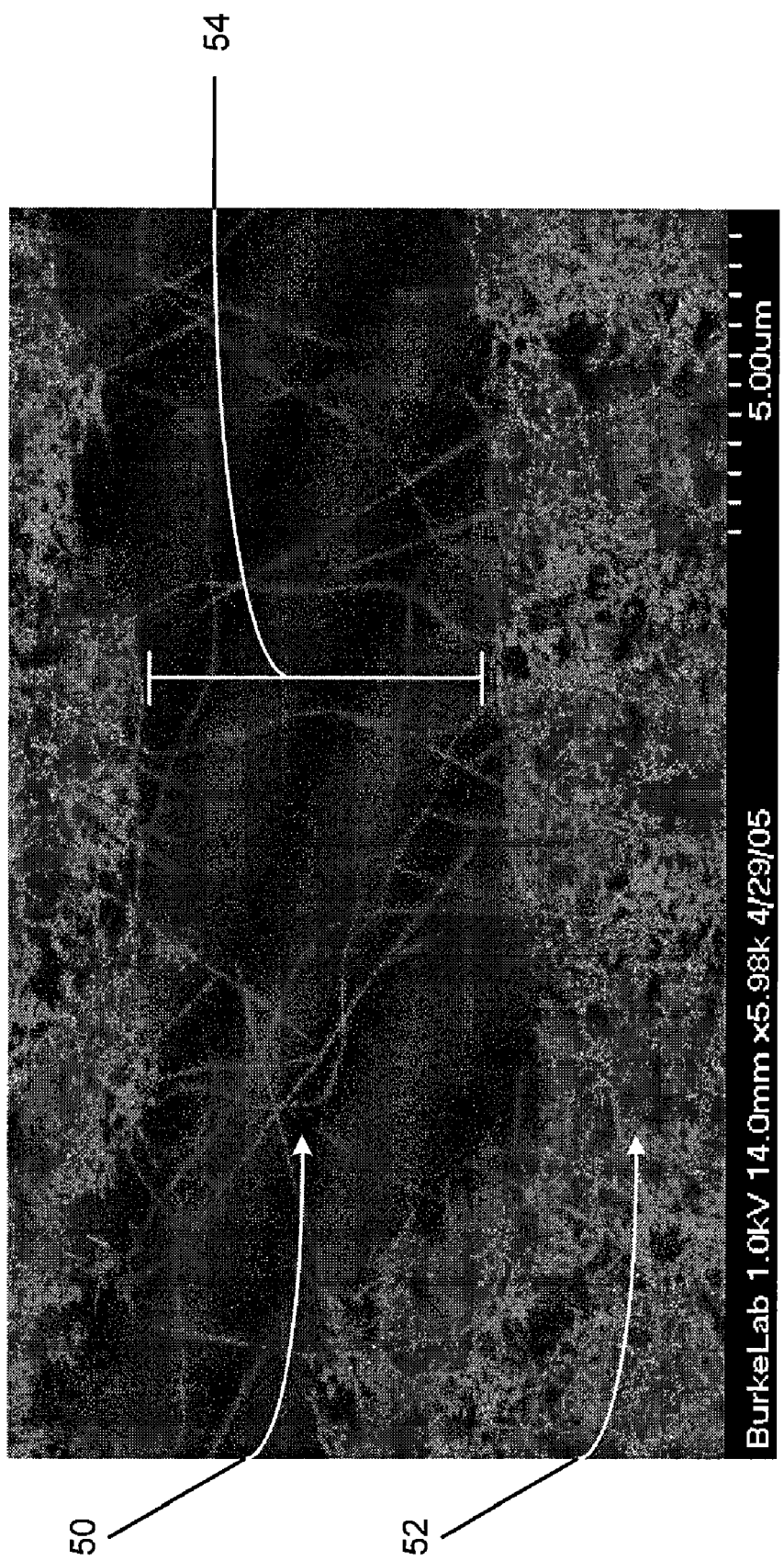
FIG. 2 to is a SEM image of nanotubes synthesized from host nanotubes.

Post-growth characterization of the nanotubes was carried out with a SEM (S-4700-2 FESEM, Hitachi, Japan). The growth results are shown in FIG. 2. As the image in FIG. 2 indicated, the experiment described herein resulted in the growth of new CNTs from the original host CNTs. The SEM image in FIG. 2 shows that the length of the host CNTs 52 are in a range of about 0.1-1 μm, within a distance of about 20 μm gap 54, or about 10 nanotubes of the deposited host CNTs bridging the gap 54. As shown, the density of the CNTs is very high. The average lengths of new or synthesized CNTs 50 are about 10 μm.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A method for synthesizing carbon nanotubes comprising the steps of
adhering a first nanotube to a substrate, and
synthesizing in a metallic catalyst-free process a second nanotube extending from the first nanotube without modification of the first nanotube, wherein the diameter of the second nanotube is equal to the diameter of the first nanotube; wherein the first and second nanotube comprise carbon nanotubes (CNTs); wherein the synthesizing step includes activating growth of the second nanotube from the first nanotube by using a methane-hydrogen mixture.

2. The method of claim 1 wherein the first and second CNTs are single wall nanotubes (SWNTs).

3. The method of claim 1 wherein the first nanotube has a length in the range of about 0.1-1 μm.

4. The method of claim 3 wherein the first nanotube has a diameter of about 0.8-1.2 nm.

5. The method of claim 1 wherein the substrate is an oxidized, p-doped Si wafer.

6. The method of claim 5 wherein the wafer includes an adhesion layer.

7. The method of claim 6 wherein the adhesion layer comprises SiO2.

8. The method of claim 7 wherein the adhesion layer has a thickness in the range of about 300-400 nm.

9. The method of claim 1 wherein the step of adhering the first nanotube to the substrate includes
forming a suspension of host nanotubes,
depositing a drop of suspension on a surface of the substrate, and
adhering the first nanotube comprising one of the host nanotubes to the substrate via Van der Waals forces.

10. The method of claim 9 wherein the forming step includes dispersing the nanotubes in a solution of DI water.

11. The method of claim 9 further comprising the step of rinsing the suspension away from the wafer and drying the substrate.

12. The method of claim 10 further comprising the step of sonicating the mixture of nanotubes and DI water.

13. The method of claim 1 wherein the step of synthesizing a second nanotube includes placing the substrate and adhered first nanotube into a furnace and growing the second nanotube via a metallic catalyst-free chemical vapor deposition process.

* * * * *